(12) United States Patent
Kliman et al.

(10) Patent No.: US 6,445,105 B1
(45) Date of Patent: *Sep. 3, 2002

(54) AXIAL FLUX MACHINE AND METHOD OF FABRICATION

(75) Inventors: Gerald Burt Kliman, Niskayuna; Charles Michael Stephens, Patterson; Patrick Lee Jansen, Alplaus, all of NY (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/286,966

(22) Filed: Apr. 6, 1999

(51) Int. Cl.[7] .............................. H02K 1/14; H02K 1/00
(52) U.S. Cl. ................... 310/268; 310/218; 310/156.35; 310/156.37
(58) Field of Search .......................... 310/44, 216, 268, 310/254, 51, 67 R, 217, 218, 43, 156.32–156.37

(56) References Cited

U.S. PATENT DOCUMENTS

| | | | | |
|---|---|---|---|---|
| 1,566,693 A | * | 12/1925 | Pletscher | 310/268 |
| 1,897,184 A | * | 2/1933 | Zopp | 310/166 |
| 2,872,604 A | * | 2/1959 | Speth | 310/166 |
| 2,873,395 A | * | 2/1959 | Kober | 310/268 |
| 4,187,441 A | | 2/1980 | Oney | 310/112 |
| 4,363,988 A | | 12/1982 | Kliman | 310/268 |
| 4,392,072 A | * | 7/1983 | Rosenberry | 310/216 |
| 4,429,263 A | * | 1/1984 | Muller | 318/254 |
| 4,578,610 A | | 3/1986 | Kliman et al. | 310/156 |
| 4,641,421 A | | 2/1987 | Stanley | 29/596 |
| 4,719,377 A | * | 1/1988 | Horie et al. | 310/44 |
| 4,866,321 A | | 9/1989 | Blanchard et al. | 310/112 |
| 4,916,346 A | | 4/1990 | Kliman | 310/216 |
| 4,933,584 A | | 6/1990 | Harms et al. | 310/162 |
| 4,947,065 A | * | 8/1990 | Ward et al. | 310/44 |
| 5,105,115 A | * | 4/1992 | Shinryo et al. | 310/258 |
| 5,168,187 A | * | 12/1992 | Baer et al. | 310/268 |
| 5,177,392 A | * | 1/1993 | Scott | 310/268 |
| 5,397,953 A | * | 3/1995 | Cho | 310/254 |
| 5,773,908 A | | 6/1998 | Stephens et al. | 310/254 |
| 5,801,473 A | | 9/1998 | Helwig | 310/254 |
| 5,804,898 A | * | 9/1998 | Kawai | 310/82 |
| 5,890,277 A | | 4/1999 | Kliman | 29/596 |
| 5,909,072 A | | 6/1999 | Muller | 310/254 |
| 5,967,763 A | * | 10/1999 | Horng | 417/423.7 |
| 5,982,058 A | * | 11/1999 | Bustamante et al. | 310/268 |
| 5,982,070 A | * | 11/1999 | Caamano | 310/216 |
| 6,034,465 A | * | 3/2000 | McKee et al. | 310/268 |
| 6,057,621 A | * | 5/2000 | Suzuki et al. | 310/258 |

OTHER PUBLICATIONS

J. F. Gieras, et al, "Synchronous Motors of Special Construction" Permanent Magnet Motor Technology Design and Applications, University of Cape Town, Rondebosch, South Africa, Chapter 7, pp. 242–249.

JR Hendershot, Jr, et al, "Design of Brushless Permanent–Magnet Motors", 1994, pp. 2–10–2–12.

GB Kliman, "Permanent Magnet AC Disc Motor Electric Vehicle Drive", SAE Technical Paper Series, International Congress & Exposition, 1983, pp. 1–9.

* cited by examiner

*Primary Examiner*—Karl Tamai
(74) *Attorney, Agent, or Firm*—Ann M. Agosti; Jill M. Breedlove

(57) ABSTRACT

An axial flux machine includes a rotatable shaft; at least one rotor disk coupled to the rotatable shaft; at least one permanent magnet supported by the at least one rotor disk; at least one stator extension positioned in parallel with the at least one rotor disk; at least two molded iron pole elements attached to the at least one stator extension and facing the at least one permanent magnet; and at least two electrical coils, each wrapped around a respective one of the at least two molded iron pole elements.

8 Claims, 9 Drawing Sheets

US 6,445,105 B1

AXIAL FLUX MACHINE AND METHOD OF FABRICATION

BACKGROUND OF THE INVENTION

The present invention relates generally to axial flux machines.

Axial flux machines, sometimes referred to as disk, axial-gap, or pancake motors, are presently used in appliances that have low to modest power requirements such as video cassette recorders and blenders, for example. Theoretically, high pole numbers can be useful for motor drive cost reduction, but prior motor designs such as those used in laminated claw pole motors and radial flux electronically commutated motors have been complex and expensive.

Thus, there is a particular need for a simple fabrication process for providing an axial flux motor having increased power density and efficiency.

BRIEF SUMMARY OF THE INVENTION

Briefly, in accordance with one embodiment of the present invention, an axial flux machine includes a rotatable shaft; at least one rotor disk coupled to the rotatable shaft; at least one permanent magnet supported by the at least one rotor disk; at least one stator extension positioned in parallel with the at least one rotor disk; at least two molded iron pole elements attached to the at least one stator extension and facing the at least one permanent magnet; and at least two electrical coils, each wrapped around a respective one of the at least two molded iron pole elements.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF THE INVENTION

Figure 1:
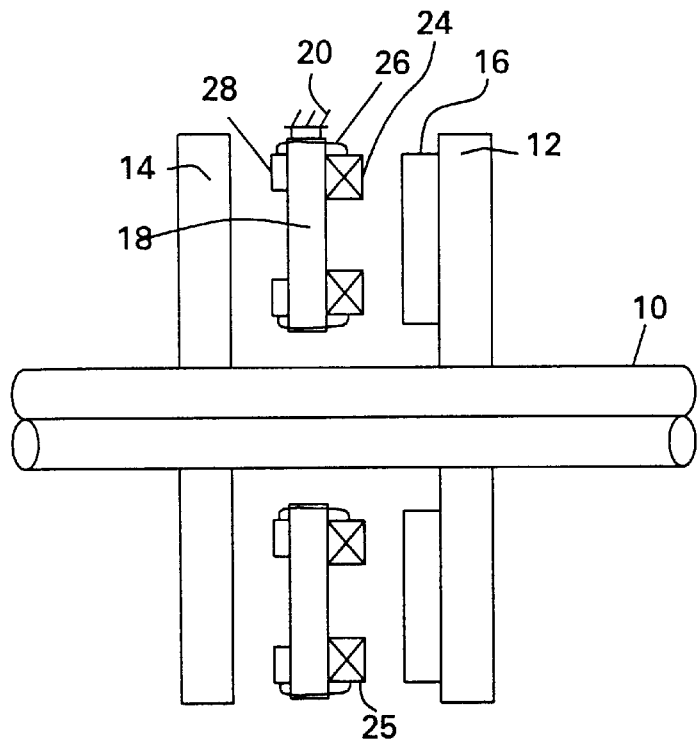
FIGS. 1 and 2 are a side view of a prior art machine and a front view of a prior art stator extension including electrical coils.
Figure 2:
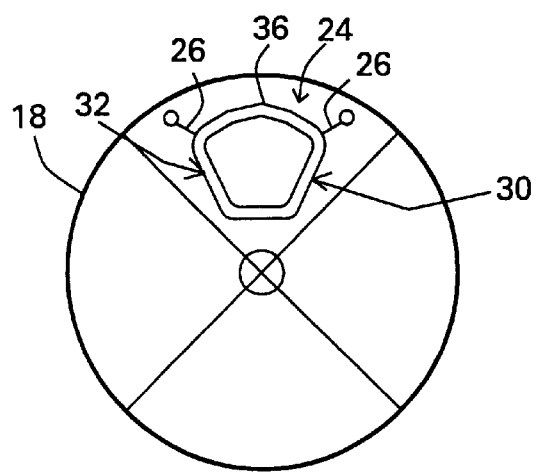

FIGS. 1 and 2 are a side view of a prior art, commercially available and a front view of a prior art stator extension 18 including electrical coils 24. The machine includes disks 12 and 14 coupled to a rotatable shaft 10. Rotor disk 12 supports at least one permanent magnet 16. Stator extension 18 is positioned in parallel with the rotor disk and supports a plurality of electrical coils 24 and 25. One such design, for example, is described in J. R. Hendershot Jr. et al., *Design of Brushless Permanent-Magnet Motors*, pp. 2–10 through 2–12 (Magna Physics Publishing and Oxford University Press 1994).

The at least one permanent magnet 16 comprises either (a) a plurality of separate, axially magnetized, thin trapezoids, or (b) a continuous ring with a multipole pattern impressed thereon. Rotor disk 12 typically comprises a solid iron disk which serves as a magnetic flux path and provides mechanical support.

Stator extension 18 typically comprises a printed circuit board coupled to a stator mount 20. Electrical coils 24 and 25 have trapezoidal shapes formed of straight radial segments 30 and 32, where electromagnetic force is developed, and large end windings 34 and 36 to complete the circuit at inner and outer radii. The radial extent of permanent magnet 16 is typically the length of radial segments 30 and 32.

Electrical coils 24 and 25 are coupled by electrical connections 26 which can be soldered to the printed circuit board with solder 28, for example. The electrical coils in the embodiments of FIGS. 1 and 2 are precision wound around pins or temporary support pieces (not shown) to minimize space requirements and to avoid lengthening the magnetic gap between disks 12 and 14. To prevent or reduce eddy and circulating current losses, the electrical coils are finely stranded and transposed. Disk 14 serves as a solid steel rotating back iron (yoke) which provides an air gap flux path (from disk 12 to disk 14) with low core losses because the air gap flux appears stationary. Permanent magnet 16 must be sufficiently thick to drive adequate magnetic flux density through the electrical coil thicknesses, the stator extension thicknesses, and the mechanical clearances around the stator extension.

Thus the prior art axial flux machine technology has a number of limitations: large magnet volume, winding losses from end windings and eddy currents, low power density from poor utilization of volume, a complex stator fabrication process, and inapplicability to high power applications.

Figure 3:
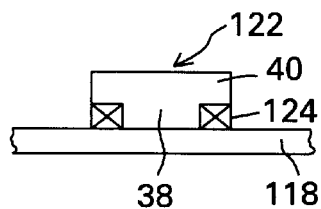
FIGS. 3 and 4 are side and front views of a stator extension including molded iron pole elements and electrical coils according to one embodiment of the present invention.
Figure 4:
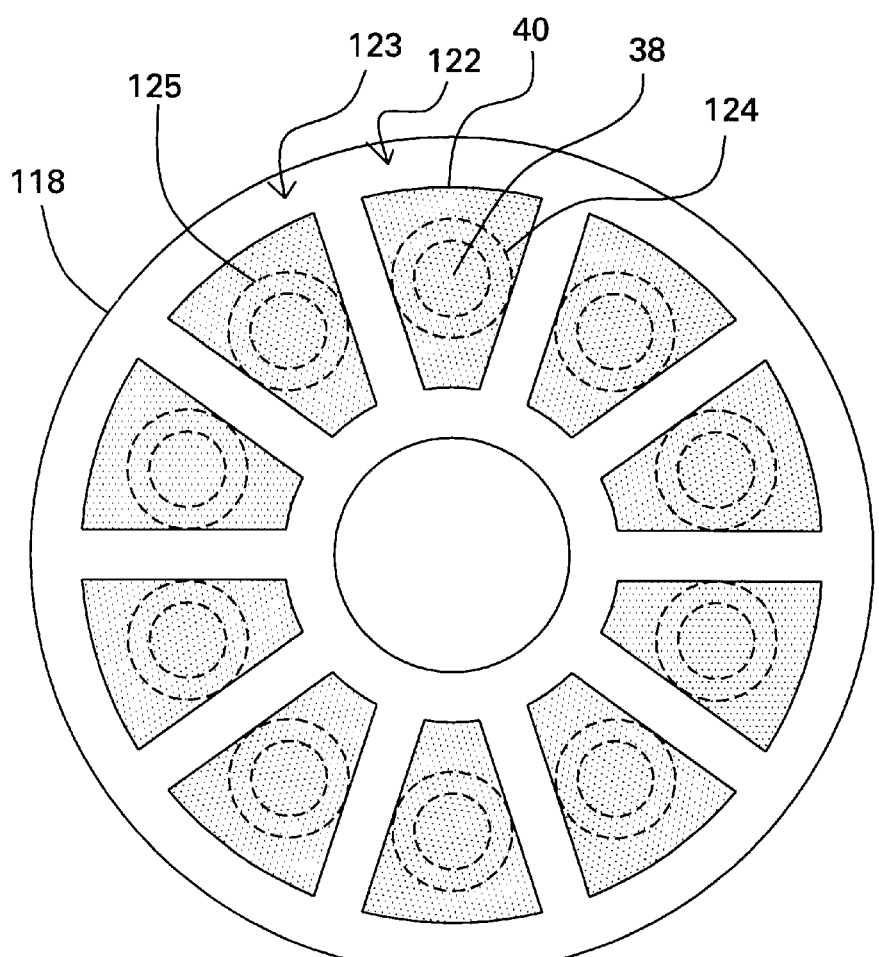

FIGS. 3 and 4 are side and front views of a stator extension 118 including molded iron pole elements 122 and 123 and electrical coils 124 and 125 wound around the molded iron pole elements according to one embodiment of the present invention. At least two molded iron pole elements 122 and 123 (and, more preferably, at least four molded iron pole elements) are attached to the at least one stator extension and face permanent magnet 16 (shown in FIG. 1). The molded iron pole elements may comprise bonded iron powder or pressed flakes, for example, and preferably are of low electrical conductivity.

A molded iron pole element is useful for reducing the effective gap (that is, the distance between the permanent magnet and the nearest magnetically conductive material) because the molded iron pole element provides a good flux path and thus reduces the amount of permanent magnet material required to drive adequate magnetic flux density. Furthermore, molded iron pole elements can be used to provide proper division of the poles. Such proper division would be difficult to achieve using laminations. If cylindrical molded iron pole elements are used, molding is simplified.

In the embodiment of FIG. 3, each molded iron pole element 122 comprises a base portion 38 around which a respective one of the electrical coils 124 is wrapped and a shield portion 40 extending over at least part of the respective electrical coils. The shield portion serves to extend the magnetic flux collection area of the molded iron pole element and shields the electrical coil from the air gap flux. When the air gap flux does not flow through the electrical coils, the electrical coils do not need to be transposed and can be random-would instead of precision-wound. Precision winding is still useful for minimizing the dimensions and minimizing winding losses. In the embodiment of FIG. 3, the molded iron pole elements can be glued to the stator extension.

If a high permeability pole element is used, the electrical coils no longer need to be trapezoidal. In one embodiment, the base portion of the pole element and the electrical coil are both circular in cross section (a feature that simplifies the coil winding process). The high permeability pole elements, by the action of the large area shield portion 40 in communication with the small area base portion 38, concentrate the magnetic flux as passed to coils 124 and allow the developed length of the coils to be shorter, thereby reducing losses. The entire coil can be used for torque production (rather than just the straight radial segments of FIG. 2) because torque is developed on the pole elements instead of the coils.

In one embodiment, fabrication of the machine includes the following steps: coupling at least one rotor disk 12 supporting at least one permanent magnet 16 to a rotatable shaft 10; attaching at least two molded iron pole elements 122 and 123 to the at least one stator extension; positioning each of at least two electrical coils 124 and 125 around respective ones of the at least two molded iron pole elements; and positioning at least one stator extension 118 in parallel with the at least one rotor disk. For ground insulation, the molded iron pole elements can be dipped or fitted with insulation pre-forms (not shown).

The above fabrication embodiment is particularly useful because the electrical coils can be pre-wound prior to being positioned around the molded iron pole elements. Further, such windings are not limited to the conventional trapezoidal shapes and may be substantially round, for example. In one embodiment, after the windings are positioned around the molded iron pole elements, the molded iron pole elements can conveniently be attached to the stator extension by gluing or force-fitting for example.

In the present invention, it is not necessary to wind individual electrical coils and connect the coils with electrical connections on a printed circuit board. If round electrical coils are used in the present invention, the electrical coils can be bobbin wound in a continuous string in the proper polarity and then slid over the molded iron pole elements. The only connections that need to be made are to an external circuit, and suitable guides for these connections (not shown) can be molded into the stator extension.

Figure 5:
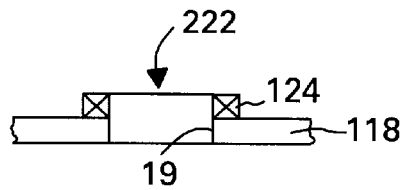
FIG. 5 is a side view of a molded iron pole element according to another embodiment of the present invention.

FIG. 5 is a side view of a molded iron pole element 222 according to another embodiment of the present invention. In this embodiment, openings 19, extend completely or partially through stator extension 118, and the molded iron pole elements 222 are force fit or otherwise situated within the respective openings.

One process for assembling a stator extension 118 with openings 19 (FIG. 5), molded iron pole elements 122 (FIG. 3), and electrical coils 124 begins by punching and interlocking standard lamination sheet stock to produce a compact stack of laminations to form a stator extension 118. The punching process includes punching holes 19 to receive molded iron pole elements 122 and shaft 10. The stator extension can be annealed in a conventional manner.

The molded iron pole elements 122 can be molded in a small press in their final form. A cylindrical base portion 38, upon which the coil will be mounted and which will be inserted into the holes provided in the stator extension, and a trapezoidal-like shield portion 40 can be formed as an integral unit. A plurality of such pole elements can be molded simultaneously in a single molding step if desired. If more convenient, the cylindrical and trapezoidal-like portions may be molded separately and then joined together. In such embodiments, it is preferred to mold the trapezoidal-like shield portion with a circular hole to receive the cylindrical base portion.

The molded iron pole elements can then be positioned and aligned in a jig (not shown). In one embodiment, the jig includes a plate into which cavities have been formed to match the trapezoidal-like shape of the shield portions. Thus the pole elements are held in the proper orientation and spacing. Prior to being placed in the jig the pole elements can be dipped in insulating varnish (not shown) or coated by other conventional means for ground insulation. Insulation pre-forms (not shown) can be placed over the cylindrical base portions as an alternative or additional ground insulation.

The electrical coils can be wound on a mandrel (not shown) in bunches, containing the proper number of turns for each pole element, in a continuous fashion with enough wire between them to reach from pole to pole. The electrical coils are then slid off the mandrel and onto the pole elements one at a time. Every other electrical coil is flipped over before being slid onto the pole element to form pole pairs. Depending on whether the machine is to be single phase, two phase, or three phase, one or more pole elements may be skipped to be subsequently wound with a different phase. In another embodiment, adjacent pole elements may be wound with the same polarity to create a longer pole pitch. An alternative technique is to spin the wire directly onto the pole elements using conventional apparatus.

Next the stator extension is positioned over the parts of the cylindrical base portions of the molded iron pole elements that are not covered by electrical coils. This step may be performed with a small amount of clearance and an adhesive or the step can be performed by force fitting. The completed assembly can be impregnated with varnish and baked if desired.

Figure 6:
FIGS. 6–9 are side views of areas, flux paths, and forces of the molded iron pole elements.
Figure 6:
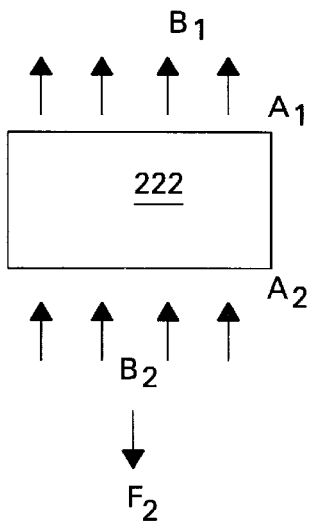
Figure 7:
Figure 7:
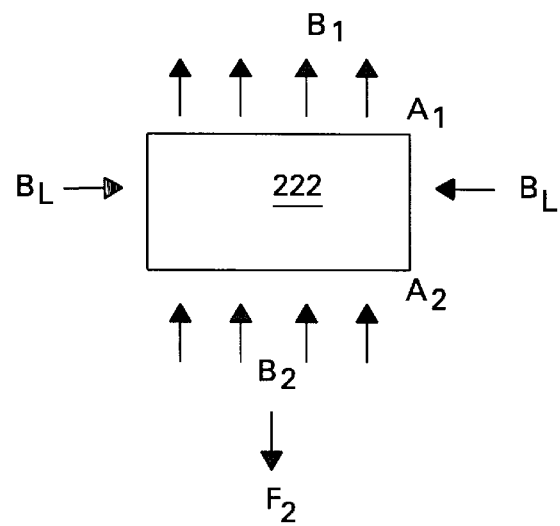
Figure 8:
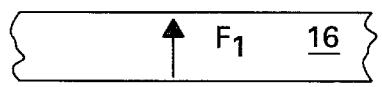
Figure 8:
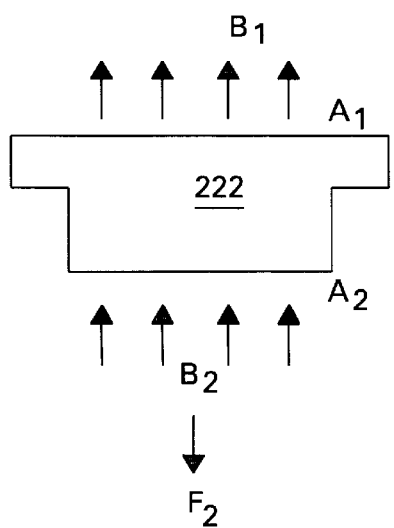

FIGS. 6–9 are side views of areas $A_1$ and $A_2$, flux paths $B_1$ and $B_2$, and forces $F_1$ and $F_2$ of the molded iron pole elements. If, as shown in FIGS. 6 and 8, no leakage flux ($B_L$) exists, a net axial force on a molded iron pole element will be zero (that is, $F_1$ balances $F_2$). Typically, however, the force equilibrium will be unstable. Mechanical stabilization can be provided by stator extension 118 (shown in FIGS. 3 and 5). Conventional stator extensions comprise printed circuit boards. With the present invention, a simpler construction can be used. In one embodiment, a material of composition such as fiberglass can be used without patterned circuit interconnections. Because magnetic flux is carried through the molded iron pole elements, the thickness of the stator extension is not critical.

In the embodiment of FIG. 8, when no leakage flux $B_L$ is present, flux $B_2$ is equal to flux $B_1$ multiplied by the ratio of the area $A_1$ of the surface including shield portions 40 over the area $A_2$ of the surface of the base portion 38. $F_1$ and $F_2$ can be approximated by the following equations:

$$F_1 \approx (\mu_o/2)*B_1{}^2*A_1,$$
$$F_2 \approx (\mu_o/2)*B_2{}^2*A_2, \approx (\mu_o/2)*(A_1/A_2)^2*B_1{}^2*A_2, \text{ and}$$
$$F_2 \approx (A_1/A_2)*F_1,$$

wherein $\mu_o$ represents permeability of free space (that is $\mu_o = 4\pi \times 10^{-7}$ Henries per meter).

Figure 9:
Figure 9:
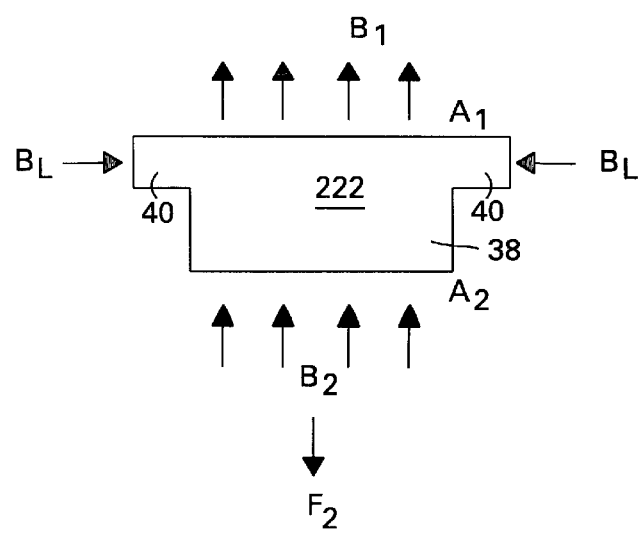

When leakage flux $B_L$ is present, the forces $F_1$ and $F_2$ on the surfaces of the molded iron pole elements 122, 222 becomes unbalanced and can result in a mechanical instability or noise problem. In the embodiment of FIG. 9, shield portions 40 can be used for balancing the forces (at least under no load conditions) because, as discussed above, the magnetic force is proportional to the square of the flux density in the respective area ratios A1 and A2. Thus the area ratios can be adjusted to balance the expected forces. Although armature reaction will tend to unbalance the forces by distortion of the fields, due to the large effective gap of the magnets, any effect is minimal.

Figure 10:
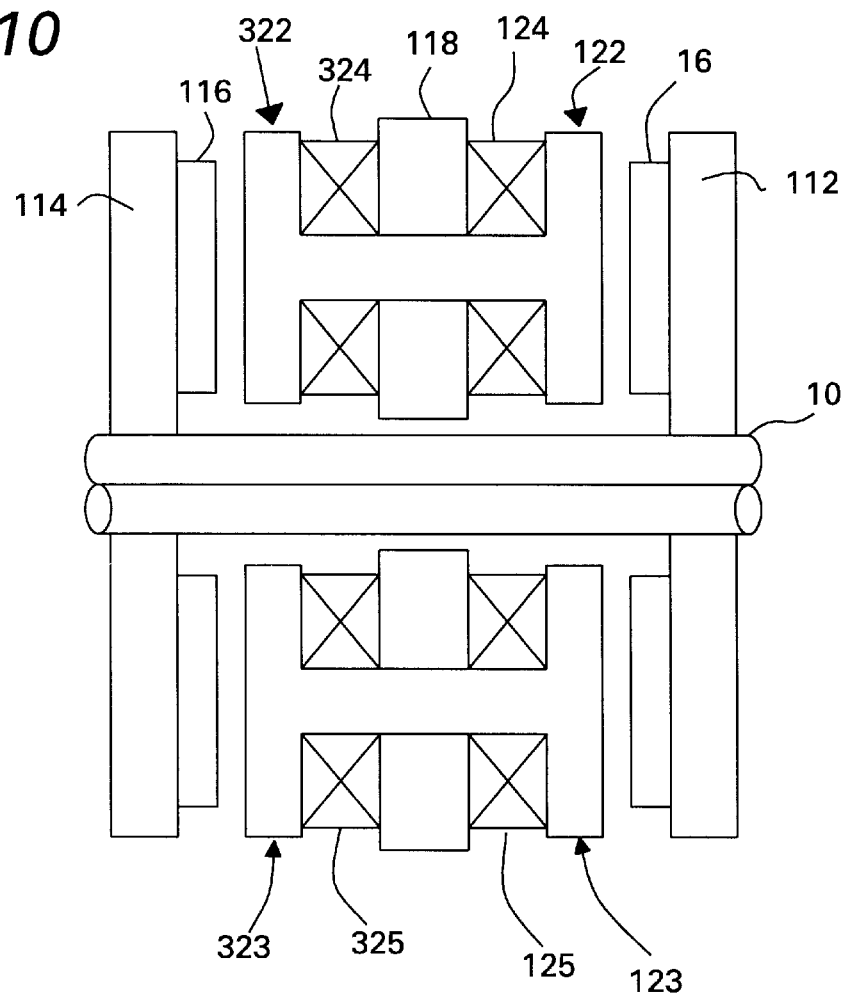
FIG. 10 is a side view of a machine according to another embodiment of the present invention.

FIG. 10 is a side view of a machine according to another embodiment of the present invention wherein a double sided geometry is used for stator extension 118. The conventional geometry of FIG. 1 may not be appropriate for high power machines. In the embodiment of FIG. 10, at least two permanent magnets 16 and 116 are situated on two rotor disks 112 and 114 and facing each other. Stator extension 118 is positioned in parallel with and between the at least two rotor disks. Two molded iron pole elements 122 and 123 (with electrical coils 124 and 125) are attached to an opposite side of stator extension 118 than two other molded iron pole elements 322 and 323 (with electrical coils 324 and 325). As further shown in FIG. 10 by molded iron pole elements 122 and 322 and molded iron pole elements 123 and 323, the molded iron pole elements can be positioned back-to-back in directly opposing positions.

Figure 11:
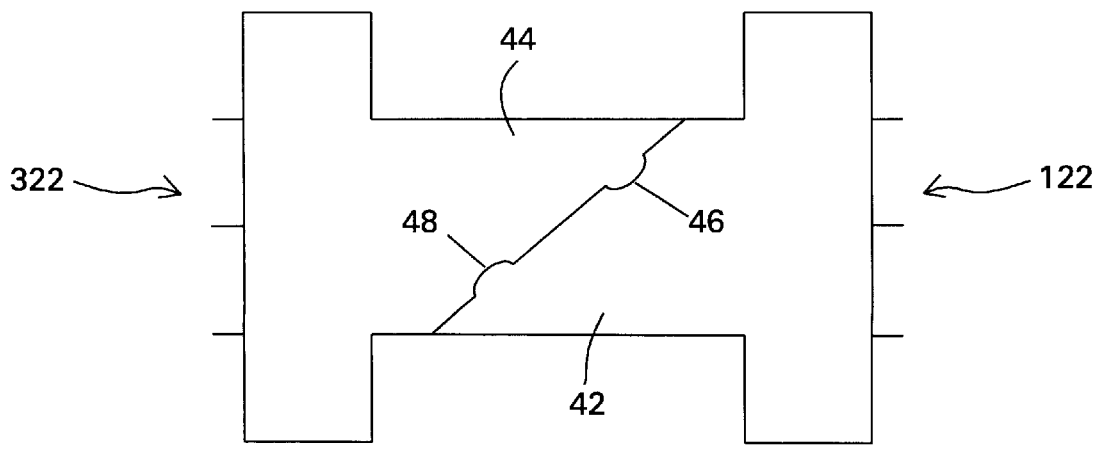
FIG. 11 is a side view of two molded iron pole elements arranged in a configuration useful for the embodiment of FIG. 10.

FIG. 11 is a side view of two molded iron pole elements 122 and 322 arranged in a configuration useful for the embodiment of FIG. 10. In this embodiment, the molded iron pole elements are positioned in directly opposing positions and coupled in any appropriate manner such as gluing or a snap configuration of portions 42 and 44 with protrusions 46 and 48, for example.

Figure 12:
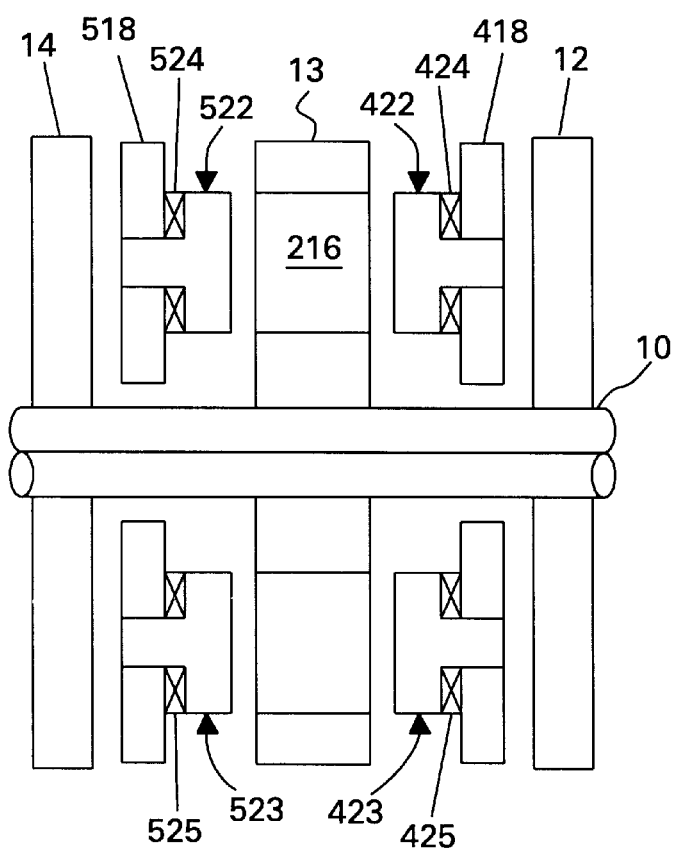
FIG. 12 is a side view of a machine according to another embodiment of the present invention.

FIG. 12 is a side view of a machine according to a double stator embodiment of the present invention. In this embodiment each of two stator extensions 418 and 518 is positioned on an opposite side of the a rotor disk 13. Molded iron pole elements (shown as 422, 423, 522, and 523) are attached to the stator extensions and face permanent magnet 216. In the embodiment of FIG. 12, at least one permanent magnet 216 extends through the rotor disk. The rotor disk in this embodiment comprises a non-magnetic material suitable for high speed operation such as aluminum.

Figure 13:
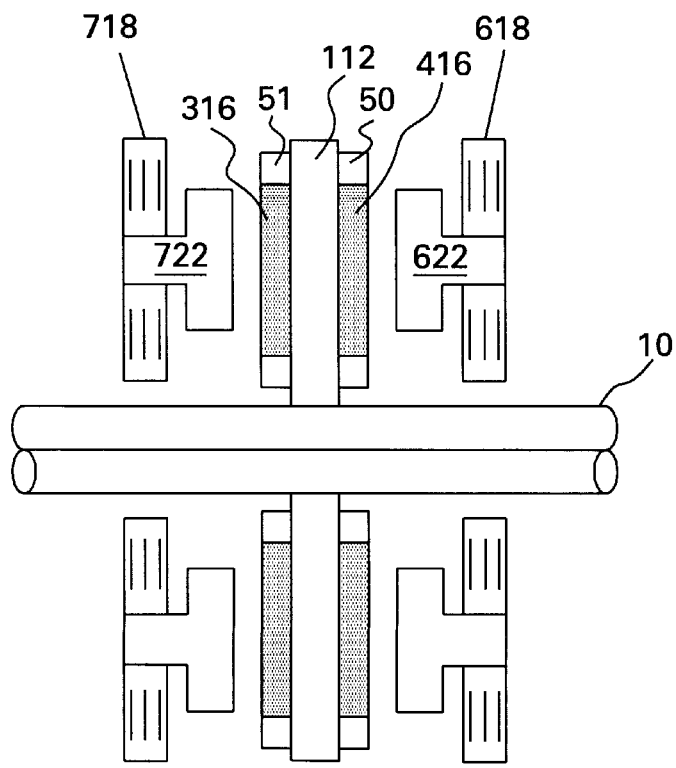
FIGS. 13 and 14 are side views of a machine according to another embodiment of the present invention.
Figure 14:
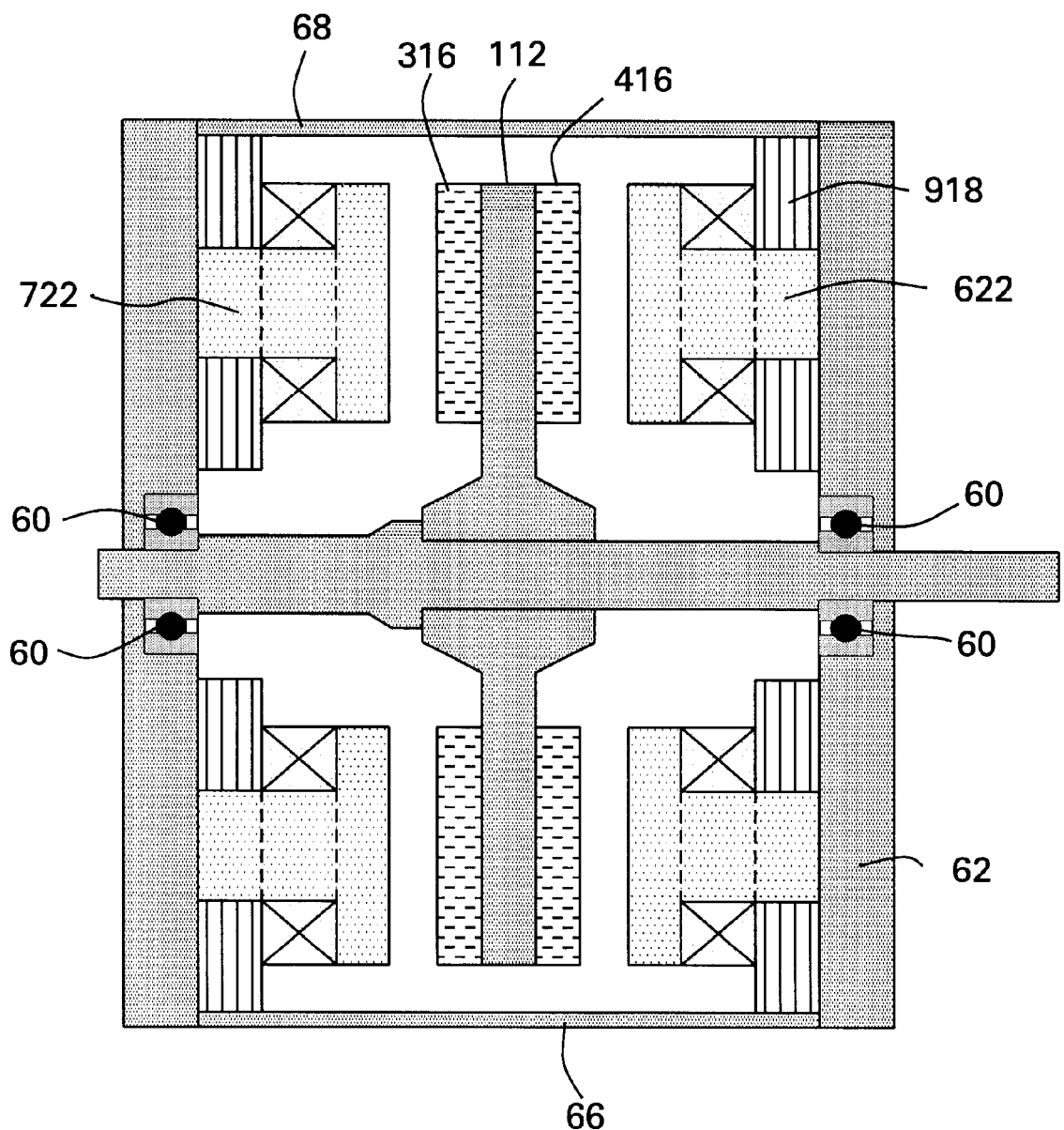

FIGS. 13 and 14 are side views of a machine according to another embodiment of the present invention which is similar to that of FIG. 12 except that instead of at least one permanent magnet which extends through the rotor disk, permanent magnets 316 and 416 are mounted on opposite sides of a rotor disk 113. In one embodiment the rotor disk comprises steel. If the magnets are mounted on a central rotor disk 113 and if the magnet polarities are in sequence, magnetic flux will travel directly across the rotor disk. Thus the thickness of the rotor disk is a function only of mechanical needs.

FIG. 13 additionally illustrates optional retainer rings 50 and 51 for retaining the permanent magnets. The retainer rings are useful at higher machine speeds. Appropriate retainer materials include aluminum or stainless steel, for example.

If the stator extensions of FIG. 14 comprise a material such as silicon steel or molded iron, then they are more robust than composition board and have better heat transfer. Because the stator extension. flux is ac and in the plane of the rotor disk, the stator, extensions can be made of laminations 918. Molded iron pole, elements are still preferred due to varying flux directions and useful complex shapes. At high speeds, high frequency losses in molded iron are lower than in laminations, and molding iron is a lower cost process than forming elements from thin laminations. FIG. 14 further shows a stator frame 62, end shields 66 and 68, and bearings 60.

The electrical coils which form the stator windings in any of the above embodiments of the present invention may be of any phase number including single, two (also referred to as single-phase bifilar-wound) and three phase windings, for example. Conventional control systems (not shown) can be used to control the machines. For example, conventional Hall sensors (not shown) can be positioned on and/or between the molded iron pole elements to control commutation. Hall sensors can be positioned directly in the active area of a magnet or near the radial ends of the magnet where leakage flux could be detected.

Figure 15:
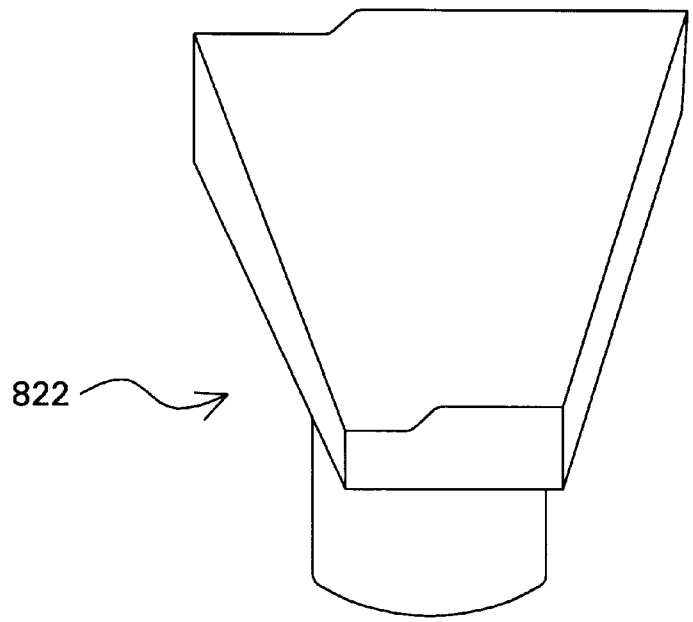
FIGS. 15 and 16 are perspective views of molded iron pole elements according to several embodiments of the present invention.
Figure 16:
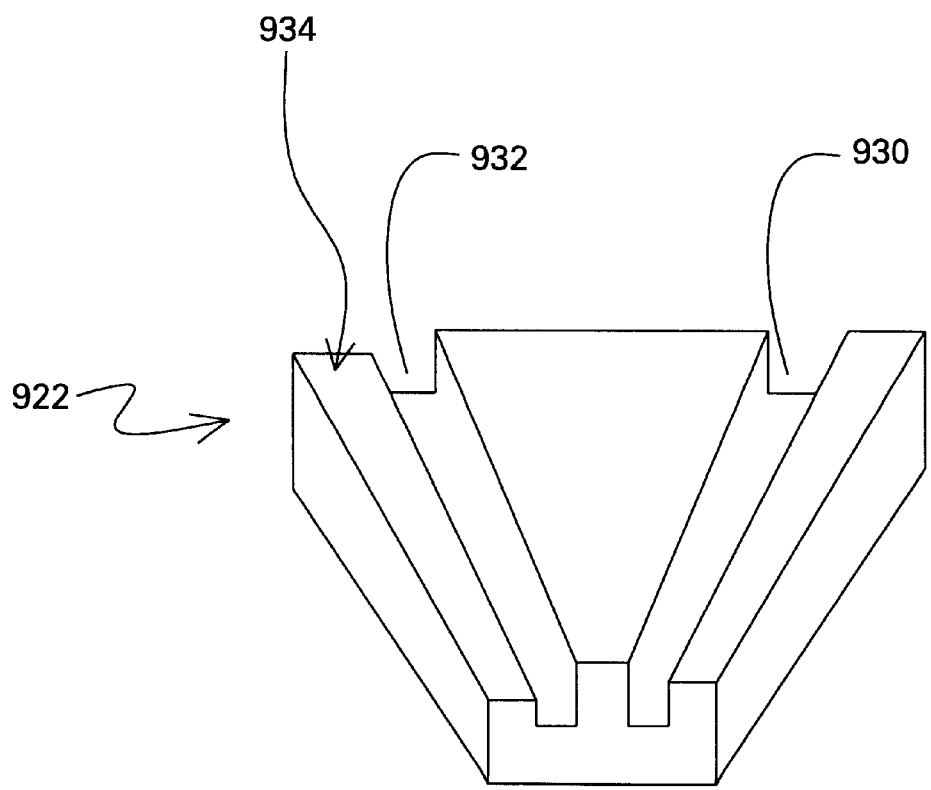

FIGS. 15 and 16 are perspective views of molded iron pole elements according to several embodiments of the present invention. Techniques to reduce reluctance torque (cogging) in radial flux motors were disclosed with respect to electronically commutated motors in commonly assigned Harms et al., U.S. Pat. No. 4,933,584. In U.S. Pat. No. 4,933,584, stator teeth include notches to mimic the magnetic reluctance of the space between the teeth and a helical rotor magnet imprint which forms a skew angle with the axis of rotation. The notches in the stator teeth and a skewed magnetic field formed by the magnetic elements reduce cogging between the rotor and the stator during rotation.

In the present invention, to avoid deadpoints common with single and two-phase machines, the molded iron pole elements 122 or 222 (FIGS. 3 and 5, respectively) can be shaped or notched to provide an uneven air gap between the molded iron pole elements and the permanent magnets as shown by molded iron pole element 822 (wherein a first shield section 880 is thicker than a second shield section 882 and the two shield sections are coupled via an asymmetrically curved shield section 884) in the embodiment of FIG. 15. When the stator is unenergized, the rotor disk will rest in a position enabling starting (particularly in single phase machines). Direction of rotation can also be controlled by the orientation of the uneven air gap. The embodiment of FIG. 15 does not reduce cogging.

In the embodiment of FIG. 16, the shield portion of the at least one molded iron pole element 922 includes two notches 930 and 932 (as compared with first shield section 980) to reduce cogging. An asymmetry is created, for example, by recessing one of the faces 934 adjacent notch 932 to avoid deadpoints common with single-phase machines. In another embodiment, a single notch can be asymmetrically positioned to avoid deadpoints.

Figure 17:
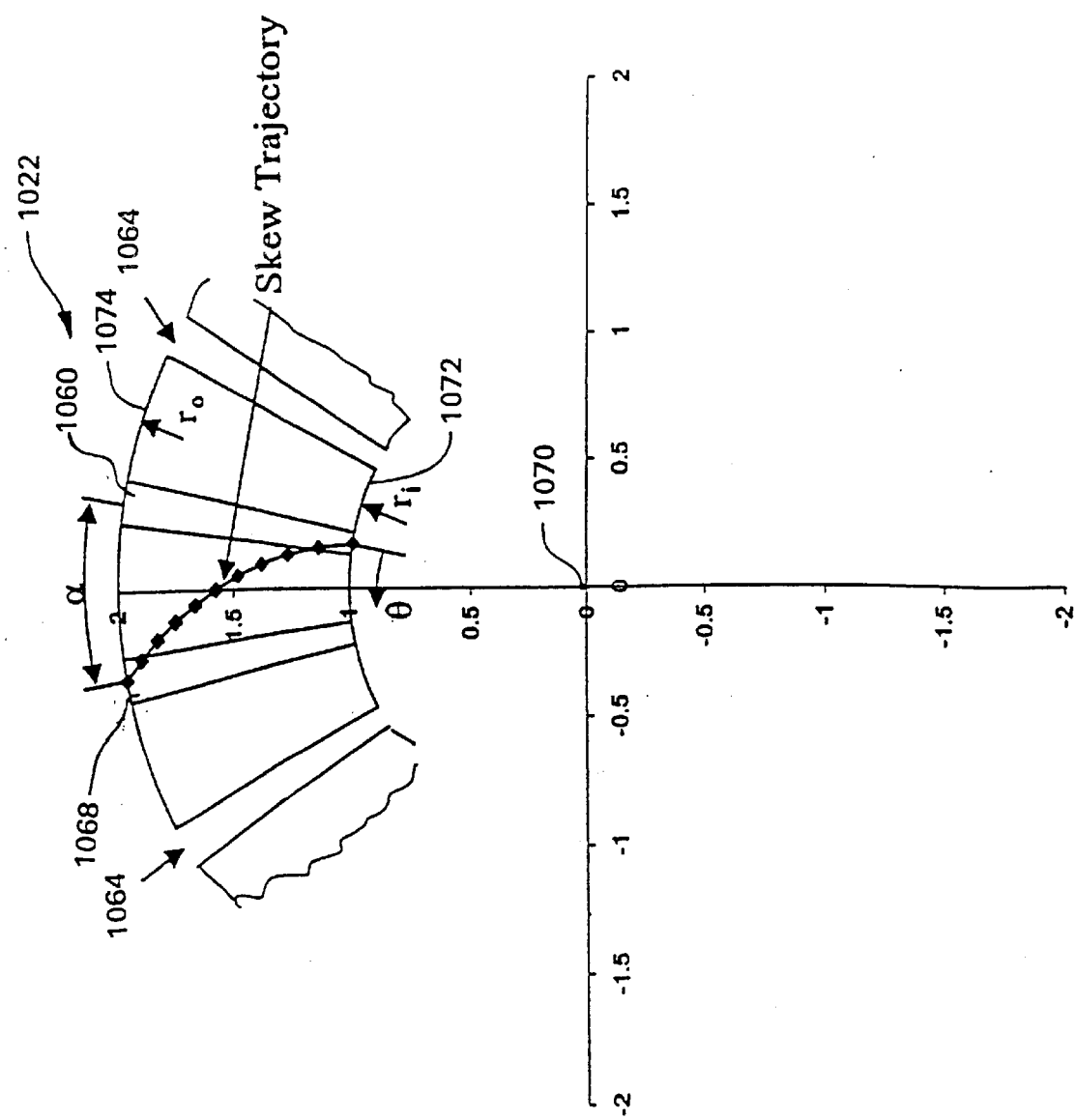
FIG. 17 is a front view of a molded iron pole element according to another embodiment of the present invention.
Figure 18:
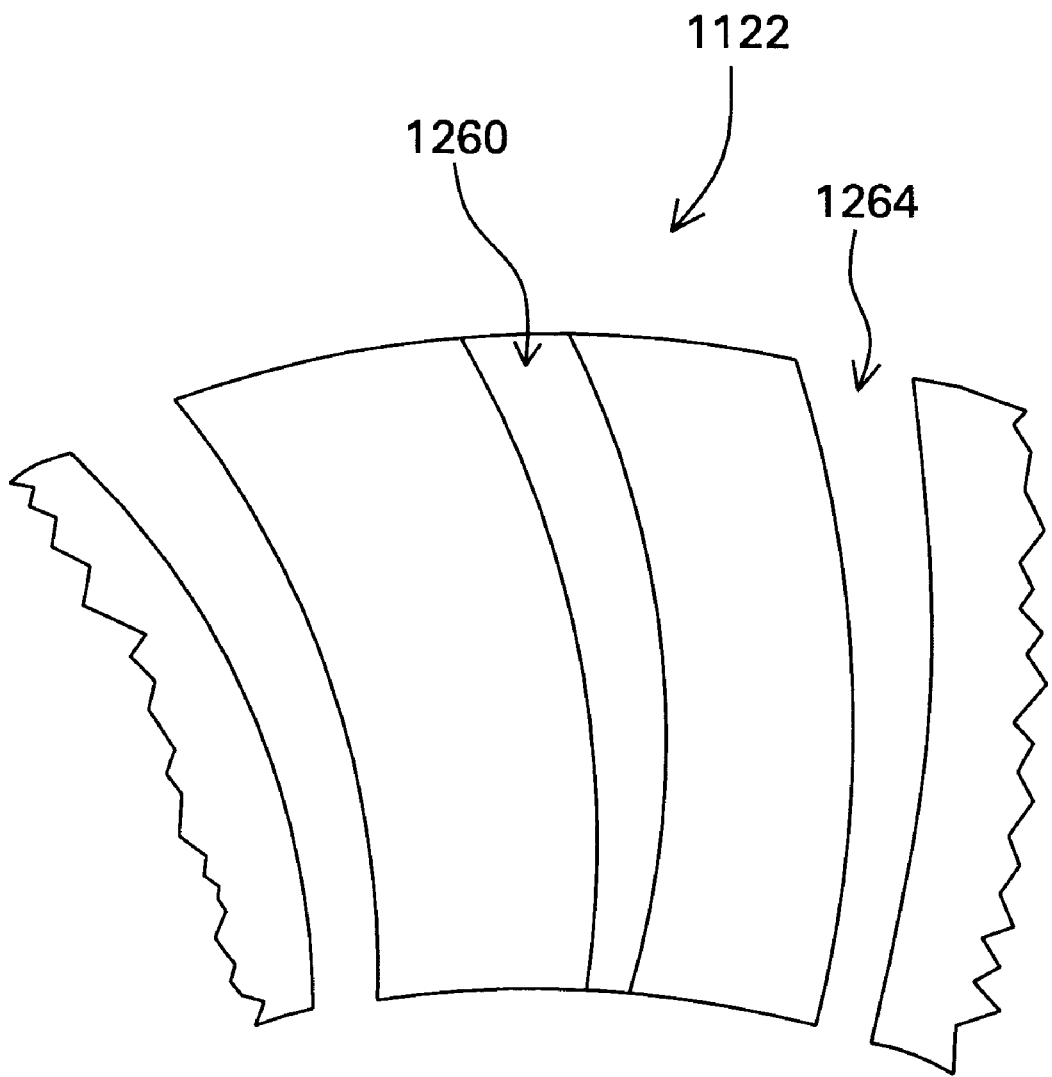
FIG. 18 is a front view of a molded iron pole element according to another element of the present invention.

In the embodiment of FIG. 17, molded iron pole element 1022 includes a plurality (shown as 2 for purposes of example) of notches 1058 and 1060. Preferably in this embodiment, there is a skew of the imprint on the magnetic element (not shown in FIG. 17) with a trajectory, for example, represented by trajectory 1062. In an alternative embodiment, as shown in FIG. 18, instead of being present on the magnetic imprint, skews are present in one or more notches 1260 of a molded iron pole element 1122 as well as in slots 1264 between the molded iron pole elements.

Notches 1058 and 1060 in one embodiment are intended to duplicate the magnetic reluctance of a slot 1064 between molded iron pole elements and the slots and notches are positioned at regular, uniform intervals about the periphery of the machine. In this embodiment, the pitch angle between the slots or notches is defined as α.

The magnetization skew trajectory spans one pitch for a single phase machine or one-half pitch for a three-phase machine, for example. The trajectory of the skew in one embodiment follows a linear relationship between the trajectory angle θ and the incremental magnetic energy in the airgap.

For an axial flux machine, the skew trajectory can be determined by assuming that the pole element edges and the notch edges follow lines of constant angle. In this embodiment, the proportion of the skew pitch area enclosed by θ can be expressed in relation to α as:

$$\frac{\theta}{\alpha} \cdot A_\alpha = \frac{\alpha}{2}(r(\theta)^2 - r_i^2);$$

wherein $r_i$ represents the radius between a center point 1070 of the stator extension and an inner surface 1072 of the pole element and $A_\alpha$ represents the skew pitch area as:

$$A_\alpha = \frac{\alpha}{2}(r_o^2 - r_i^2),$$

wherein $r_o$ represents the radius between the center point and an outer surface 1072 of the pole element.

By combining these relationships, the radial trajectory coordinate r corresponding to the peripheral trajectory coordinate θ can be determined as follows:

$$r(\theta) = \sqrt{r_o^2 \cdot \frac{\theta}{\alpha} + r_i^2 \cdot \left(1 - \frac{\theta}{\alpha}\right)} \text{ for } 0 \leq \theta \leq \alpha.$$

Asymmetry in the magnetic pole configuration is useful for a single phase machine for achieving resting positions that will readily permit machine starting.

Although the above discussion relates to a magnetization skew, the analysis and resulting formula is identical for the geometrical skew calculations of the notches and slots of FIG. 18. In some embodiments, a magnetization skew may be present in combination with a geometrical skew with a net skew given by the above equation.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An axial flux machine comprising:
   a rotatable shaft;
   at least one rotor disk coupled to the rotatable shaft;
   at least one permanent magnet supported by the at least one rotor disk;
   at least one stator extension positioned in parallel with the at least one rotor disk;
   at least two molded iron pole elements attached to the at least one stator extension and facing the at least one permanent magnet, each of the at least two molded iron pole elements comprising a base portion and a shield portion, the shield portions of the at least two molded iron pole elements each shaped with a first shield section of the shield portion being thicker than a second shield section to provide an uneven air gap between the at least two molded iron pole elements and at least one permanent magnet, and each of the shield portions of the at least two molded iron pole elements including at least one notch with the first and second shield sections being situated on opposite sides of the at least one notch
   at least two electrical coils, each wrapped around a base portion of a respective one the at least two molded iron pole elements, the respective shield portion of the respective one of the at least two molded iron pole elements extending over at least a part of the respective one of the at least two electrical coils.

2. The machine of claim 1 wherein the at least one notch comprises a radially extending notch, wherein adjacent molded iron pole elements form slots between adjacent shield portions, and wherein the slots and radially extending notches are spaced at substantially uniform intervals.

3. The machine of claim 2 wherein the notches and the slots are geometrically skewed.

4. An axial flux machine comprising:
   a rotatable shaft;
   at least one rotor disk coupled to the rotatable shaft;
   at least one permanent magnet supported by the at least one rotor disk;
   at least one stator extension positioned in parallel with the at least one rotor disk;
   at least two molded iron pole elements attached to the at least one stator extension and facing the at least one permanent magnet, each of the at least two molded iron pole elements comprising a base portion and a shield portion, the shield portions of the at least two molded iron pole elements each shaped with a first shield section of the shield portion being thicker than a second shield section to provide an uneven air gap between the at least two molded iron pole elements and at least one permanent magnet, the shield portions of the at least two molded iron pole elements each including a plurality of radially extending notches with the first and second shield sections being situated on opposite sides of at least one of the radially extending notches;
   at least two electrical coils, each wrapped around a base portion of a respective one the at least two molded iron pole elements, the respective shield portion of the respective one of the at least two molded iron pole elements extending over at least a part of the respective one of the at least two electrical coils.

5. The machine of claim 4 wherein adjacent molded iron pole elements form slots between adjacent shield portions and wherein the slots and radially extending notches are spaced at substantially uniform intervals.

6. The machine of claim 5 wherein the at least one permanent magnet comprises at least one permanent magnet with a magnetization skew trajectory.

7. An axial flux machine comprising:
   a rotatable shaft;
   at least one rotor disk coupled to the rotatable shaft;

at least one permanent magnet supported by the at least one rotor disk and having a magnetization skew trajectory represented by the following equation:

$$r(\theta) = \sqrt{r_o^2 \cdot \frac{\theta}{\alpha} + r_i^2 \cdot \left(1 - \frac{\theta}{\alpha}\right)} \text{ for } 0 \le \theta \le \alpha.$$

wherein α represents a pitch angle between the substantially uniform intervals; θ represents a trajectory coordinate; $r_i$ represents a radius between a center point of the at least one stator extension and an inner surface of the pole element, and $r_o$ represents a radius between the center point of the at least one stator extension and an outer surface of the pole element;

at least one stator extension positioned in parallel with the at least one rotor disk:

at least two molded iron pole elements attached to the at least one stator extension and facing the at least one permanent magnet, each of the at least two molded iron pole elements comprising a base portion and a shield portion include a plurality of radially extending notches, wherein adjacent molded iron pole elements form slots between adjacent shield portions and wherein the slots and radially extending notches are spaced at substantially uniform intervals;

at least two electrical coils, each wrapped around a base portion of a respective one the at least two molded iron pole elements, the respective shield portion of the respective one of the at least two molded iron pole elements extending over at least a part of the respective one of the at least two electrical coils.

8. An axial flux machine comprising:

a rotatable shaft;

at least one rotor disk coupled to the rotatable shaft:

at least one permanent magnet supported by the at least one rotor disk at least one stator extension positioned in parallel with the at least one rotor disk:

at least two molded iron pole elements attached to the at least one stator extension and facing the at least one permanent magnet, each of the at least two molded iron pole elements comprising a base portion and a shield portion include at least one radially extending notch, wherein adjacent molded iron pole elements form slots between adjacent shield portions and wherein the slots and radially extending notches are spaced at substantially uniform intervals and are geometrically skewed as represented by the following equation:

$$r(\theta) = \sqrt{r_o^2 \cdot \frac{\theta}{\alpha} + r_i^2 \cdot \left(1 - \frac{\theta}{\alpha}\right)} \text{ for } 0 \le \theta \le \alpha.$$

wherein α represents a pitch angle between the substantially uniform intervals; θ represents a trajectory coordinate; $r_i$ represents a radius between a center point of the at least one stator extension and an inner surface of the pole element, and $r_o$ represents a radius between the center point of the at least one stator extension and an outer surface of the pole element; and at least two electrical coils, each wrapped around a base portion of a respective one the at least two molded iron pole elements, the respective shield portion of the respective one of the at least two molded iron pole elements extending over at least a part of the respective one of the at least two electrical coils.

* * * * *